(12) United States Patent
Clark et al.

(10) Patent No.: US 7,574,172 B2
(45) Date of Patent: Aug. 11, 2009

(54) SYSTEM AND METHOD TO FACILITATE WIRELESS WIDE AREA COMMUNICATION IN A WELDING ENVIRONMENT

(75) Inventors: Keith Clark, Concord, OH (US); Christopher Hsu, Mentor, OH (US); George Daryl Blankenship, Chardon, OH (US)

(73) Assignee: Lincoln Global, Monterey Park, CA (US)

( * ) Notice: Subject to any disclaimer, the term of this patent is extended or adjusted under 35 U.S.C. 154(b) by 832 days.

(21) Appl. No.: 09/962,437

(22) Filed: Sep. 25, 2001

(65) Prior Publication Data

US 2005/0197115 A1    Sep. 8, 2005

(51) Int. Cl.
*H04B 7/24* (2006.01)
(52) U.S. Cl. ............... 455/39; 455/426.1; 455/437; 455/438; 455/423
(58) Field of Classification Search ............. 455/426.1, 455/41.1, 41.2, 437, 438, 39, 423; 219/130.01, 219/125.1, 130.21, 132, 137 R; 709/217, 709/219; 700/3, 90, 95, 108, 117, 145, 162
See application file for complete search history.

(56) References Cited

U.S. PATENT DOCUMENTS

| | | | |
|---|---|---|---|
| 3,623,105 A | 11/1971 | Kamen | |
| 5,043,646 A * | 8/1991 | Smith et al. ................ | 318/581 |
| 5,491,831 A | 2/1996 | Williams et al. | |
| 5,768,687 A | 6/1998 | Marzoug | |
| 5,932,123 A | 8/1999 | Marhofer et al. | |
| 5,981,905 A * | 11/1999 | Ohmi et al. ............ | 219/130.01 |
| 6,230,005 B1 | 5/2001 | Le et al. | |
| 6,236,864 B1 | 5/2001 | McGowan et al. | |
| 6,243,483 B1 | 6/2001 | Petrou et al. | |
| 6,243,657 B1 | 6/2001 | Tuck et al. | |
| 6,246,688 B1 | 6/2001 | Angwin et al. | |
| 6,957,063 B1 * | 10/2005 | Kåll ...................... | 455/414.1 |
| 7,024,161 B1 * | 4/2006 | LaMedica, Jr. ........... | 455/67.11 |
| 2001/0020944 A1 | 9/2001 | Brown et al. | |
| 2002/0032495 A1 * | 3/2002 | Ozaki ........................ | 700/108 |
| 2003/0040319 A1 * | 2/2003 | Hansen et al. ............. | 455/452 |
| 2003/0086405 A1 * | 5/2003 | Silva et al. .................. | 370/342 |
| 2005/0159107 A1 * | 7/2005 | Mauney et al. ............. | 455/41.2 |
| 2005/0221828 A1 * | 10/2005 | Wakuta et al. ............. | 455/437 |
| 2005/0253703 A1 * | 11/2005 | He et al. ................ | 340/539.13 |
| 2006/0023696 A1 * | 2/2006 | Berger et al. ................ | 370/352 |

(Continued)

OTHER PUBLICATIONS

International Search Report Dated Aug. 1, 2002, for International Application No. PCT/US02/14387 filed May 8, 2002.

(Continued)

*Primary Examiner*—Patrick N Edouard
*Assistant Examiner*—Justin Y Lee
(74) *Attorney, Agent, or Firm*—Turocy & Watson, LLP

(57) ABSTRACT

A system and method for wireless communication with a welding system is provided. The system includes a welding system having a WAP client component and a wireless communication component facilitating post second generation mobile communications between the welding system and a WAP gateway component. The welding system can further include a global positioning component and/or a browsing component. The invention further comprises methodologies for facilitating wireless communication with a welding system.

22 Claims, 12 Drawing Sheets

U.S. PATENT DOCUMENTS

2006/0031591 A1* 2/2006 Hollstrom et al. ........... 709/250

OTHER PUBLICATIONS

Shapely, Deborah. *The Universal Cell Phone*. Technology Review; Apr. 2001. pp. 59-62.

*WAP—Wireless Application Protocol*. http://www.hippy.freeserve.co.uk/wap.htm. pp. 1-13. Last viewed on Jun. 18, 2001.

Buckingham, Simon. *GSM: More than a Technology . . . It's a Way of Life*. GSM World. http://www.gsmworld.com/technology/yes2wap.html. pp. 1-18. Last viewed on Jun. 19, 2001.

\* cited by examiner

US 7,574,172 B2

SYSTEM AND METHOD TO FACILITATE WIRELESS WIDE AREA COMMUNICATION IN A WELDING ENVIRONMENT

TECHNICAL FIELD

The present invention relates generally to computer and welding systems, and more particularly to a system and method of wide area wireless communications with welding systems.

BACKGROUND OF THE INVENTION

Welding systems reside at the core of the modem industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modem and more complex manufacturing operations, however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers and/or across the globe has become more challenging, time consuming and expensive.

One such challenge relates to locating, communicating with, servicing and troubleshooting welding systems worldwide. For example, mobile welding system(s) can be located on construction sites, large ship yard and even barges in the ocean. Conventional welding systems often require engineers to travel to physically remote locations in order to provide service and/or troubleshooting support.

Another challenge facing welding systems relates to maintenance. Welders are often maintained and serviced according to procedures implemented by operators of the welding systems. Although some operators may adequately service and maintain these systems, quality of the service and maintenance is often up to the training and competence of the individual operator. Thus, a large collection of well-maintained welders servicing an overall assembly process may be at the mercy of another welding system that is not properly serviced or maintained. This may cause the process to stop or be disrupted during service outages relating to a poorly maintained welder. Even under the best of circumstances, however, given that many welding systems are operating in an isolated manner, diagnostic information relating to the health of these systems is often not reported or discovered until after a breakdown occurs.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The demand for mobile communications has expanded at a rapid pace and is expected to do so for at least the next decade. The second-generation Global System for Mobile communications (GSM) digital cellular standard, while an improvement on first-generation mobile communications, is not expected to be able to handle the quantities of information needed to be transmitted. Accordingly, post-second generation mobile communications standards (e.g., third generation (3G)) must provide high speed packet data (e.g., associated with streaming video) and/or voice transmittal. With the increasing use of mobile communications, the need to wirelessly transmit greater quantities of information has grown. Thus, mobile communication systems are evolving to meet higher communication capacity requirements. For example, one communication system that has evolved from a communication system operating according to the well-known IS-95A standard is commonly referred to as the CDMA 2000 communication system. The IS-95A and CDMA 2000 communication systems are generally compatible systems. Other systems compatible with one or more of the existing systems, such as Wide Band CDMA (WCDMA) system, are also being proposed and implemented. The ability of software embedded in mobile communication device(s) (e.g., mobile phone) to be reprogrammed (e.g., to perform operations in the base band, intermediate-frequency and even the radio-frequency bands) has been introduced with the advent of 3G technology. Further, the ability to shift among multiple channels—depending on which type of communication is called for—analog or digital voice transmission, high-speed data, or broadband is also facilitated. Finally, 3G technology can also embrace cognitive technology whereby device(s) equipped with mobile communication means negotiate with owner(s)/manager(s) of frequency channel(s) for temporary use of the frequency.

The present invention relates to a system and method of wireless communication with welding system(s) utilizing a post second generation service (e.g., third generation protocol such as CDMA 2000 and/or IS-95 3G). In accordance with an aspect of the present invention, a welding system has a welding component, a wireless application protocol (WAP) client component and a wireless communication component. Communication of content between the welding component and other device(s) is facilitated via the welding component (e.g., via WML and/or WML script document(s)). The transfer of information between the welding system and other device(s) is accomplished via the wireless communication component (e.g., via a post second generation wireless communication system).

In accordance with another aspect of the present invention, a welding system having a wireless communication component is operatively coupled to a WAP gateway (e.g., via a post second generation service wireless communication system). The WAP gateway is operatively coupled to remote system(s) having welding resource component(s). The WAP gateway thus facilitates wireless communication between the welding system(s) and the remote system(s). The WAP client can communicate with the WAP gateway via a mark up language, for example, the wireless markup language (WML).

According to another aspect of the present invention, the welding system can be provided with a global positioning component adapted to provide information regarding the global position of the welding system to the remote system. The global positioning component thus facilitates locating of welding system(s) by a remote system, for example, for troubleshooting, maintenance, welding application development and/or servicing. The global positioning component can assist in locating a welding system across the world, for example, on a barge in the Indian ocean, on a construction site in a remote location in Nevada or on the factory floor of a large industrial environment.

Yet another aspect of the present invention provides for a wireless communication device (e.g., personal data assistant or laptop computer) to be adapted for wide area wireless communication with a welding system. A user (e.g., weld engineer or operator) utilizing the wireless communication device can thus communicate information to the welding system (e.g., parameter settings and load new weld procedures). The user is further able to retrieve information from the welding system (e.g., wire usage, error logs and diagnostic information).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
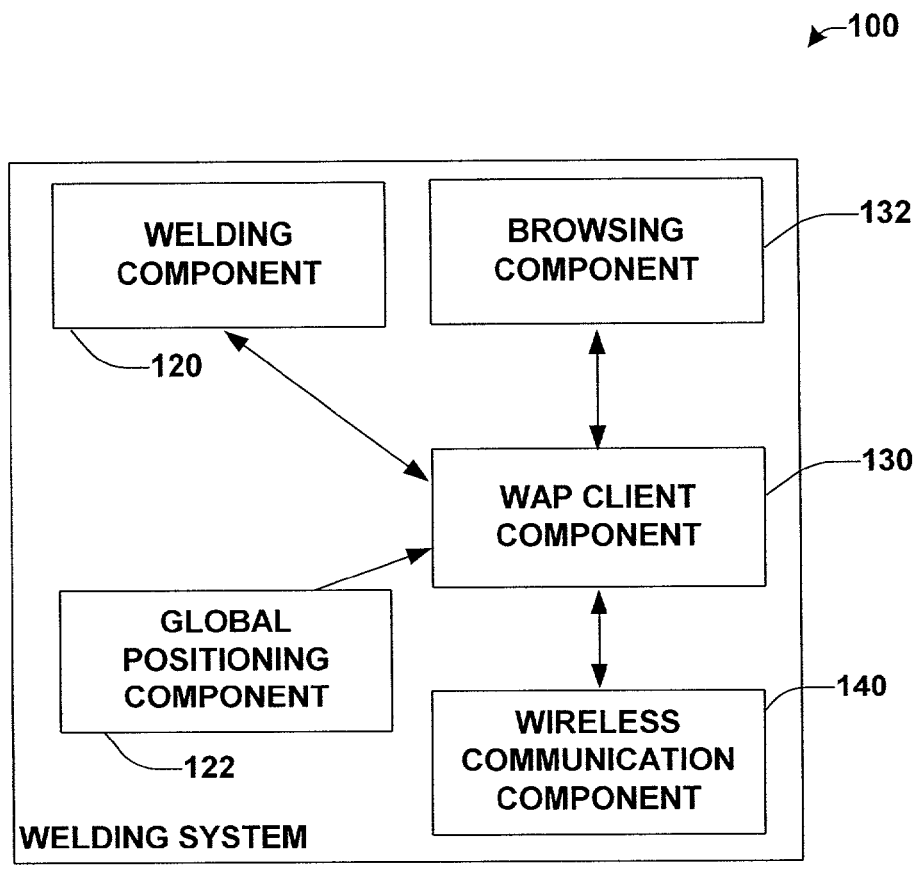
FIG. 1 is a schematic block diagram illustrating a welding system facilitating wireless communication in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

As used in this application, Wireless Application Protocol (WAP) refers to a collection of protocols and transport layers that enable mobile communication (e.g., wireless) between a mobile device (e.g., mobile phone) and a server (e.g., a server installed in a mobile phone network) over airways. Generally, WAP can place the "intelligence" in WAP Gateway(s) thus allowing mobile device(s) to be equipped with micro-browser(s). WAP is a structured protocol that is generally transmission technology independent. Accordingly, information can be exchanged between a WAP client and a WAP server in a wide variety of formats, for example, Short Message Service (SMS), Circuit Switched Data (CSD), Unstructured Supplementary Service Data (USSD) and General Packet Radio Service (GPRS). WAP thus allows for flexibility in the development of applications and in the exchange of information.

"Post second generation service" (e.g., third generation (3G)) refers to mobile communication technology providing capability for high speed packet data (e.g., associated with streaming video and/or voice transmittal), for example, CDMA 2000 and/or Wide Band CDMA (WCDMA). Post second generation technology can also include reprogrammable software embedded in mobile communication device(s) (e.g., mobile phone), thus allowing for additional functionality of hardware employed for radio communication. Post second generation technology can also include cognitive technology whereby mobile device(s) negotiate with owner(s)/manager(s) of frequency channel(s) for temporary use of the frequency.

A "node" of a welding cell refers to a physical hardware component of a welding system including, but not limited to, a wire feeder, contact tip, dresser, gas mixer, gas sneezer, gas controller, clamp actuator, travel carriage/part manipulator, robot arm/beam/torch manipulator, laser seam tracker, other input/output devices and welding power source. "Welding cell" refers to a grouping of physical hardware components (nodes). It is to be appreciated that a node and/or welding cell can comprise a combination of hardware and software or in some cases simply software (e.g., virtual node or welding cell).

Referring to FIG. 1, a welding system 100 facilitating wireless communication in accordance with an aspect of the present invention is illustrated. The welding system 100 includes a welding component 120, a WAP client component 130 and a wireless communication component 140. The welding component 120 can include node(s) of a welding cell and/or associated peripheral device(s), for example, test equipment, monitoring equipment, a consumable usage monitor, an arc/weld monitor and/or a welding data store.

The WAP client component 130 facilitates transfer of information between the welding component 120 and other device(s) (not shown). The WAP client component 130 can receive information from the welding component 120 and place it into a format, for example, a WML document, for transmission to other device(s) (not shown) via the wireless communication component 140. The WAP client component can receive information (e.g., WML and/or WML script document(s)) from other device(s) (not shown) via the wireless communication component 140.

The wireless communication component 140 facilitates communication between the welding system 100 and other devices (not shown), for example, a WAP gateway, a computer system and/or a personal digital assistant. The wireless communication component 140 can utilize post second generation mobile communications technology (e.g., 3G) to communicate with other device(s) (e.g., WAP gateway). The wireless communication component 140 can include software that is reprogrammable. The wireless communication component 140 can further communicate via one channel and/or shift among multiple channels, for example, depending on the type of communication being performed (e.g., voice, data and/or high-speed data). The wireless communication component 140 can further be adapted to utilize a particular communications modality based upon, for example, upon a priority level. Further, the wireless communication component 140 can be adapted to perform cognitive function(s) to facilitate communications. For example, the wireless communication component 140 can determine frequencies available for communication (e.g., temporary use), determine cost(s) associated with communication on each of the frequencies, negotiate usage rights with the owner(s) of the channels. Additionally, the wireless communication component 140 can further monitor the quality of transmission and/or receipt of information and adaptively modify the transmission frequency. It is to be appreciated that wireless communications component 140 can include means for mobile communications that are embedded within the welding system 110, for example a printed circuit board equipped with a mobile communication chip set (not shown), and/or external to the welding system 110, for example, a mobile phone (not shown) serving as a mobile communication modem for the welding system 110.

For example, a welding system 100 being utilized on a remote construction site can communicate with a manufacturer's Internet web site to facilitate troubleshooting of the welding system 100. A welding component 120, for example, a welding power source detecting an unexpected voltage setting, can communicate with the manufacturer's Internet web site by initiating communication via the WAP client component 130. The WAP client component 130 can generate information (e.g., WML and/or WML script document) to be transmitted to the manufacturer's Internet web site (e.g., a request for information and/or application engineer assistance) via the wireless communication component 140. The wireless communication component 140 can determine a priority level associated with the information generated by the WAP client component 130, for example, based on a user's request and/or a predetermined priority level. The wireless communication component 140 can utilize an appropriate modality of communication. For example, the user can determine that due to contractual responsibilities (e.g., damages related to delay), an otherwise time indifferent request should be given high priority.

The welding system 100 can further include a browsing component 132 facilitating user interface of the welding system 100 with other devices (not shown). The browsing component 132 can include a microbrowser for receiving, for example, WML document(s) and/or an HTTP client. Thus, via the browsing component 132, a user of the welding system 100 can access welding resource(s) via the Internet.

The welding system 100 can, optionally, further include a global positioning component 122 facilitating identification of a geographical location of the welding system 100. For example, the global positioning component 122 can receive signal(s) from Global Positioning Satellites (GPS) and forward associated geographical location information to the WAP client component 130 for transmittal to remote device(s) (not shown).

Figure 2:
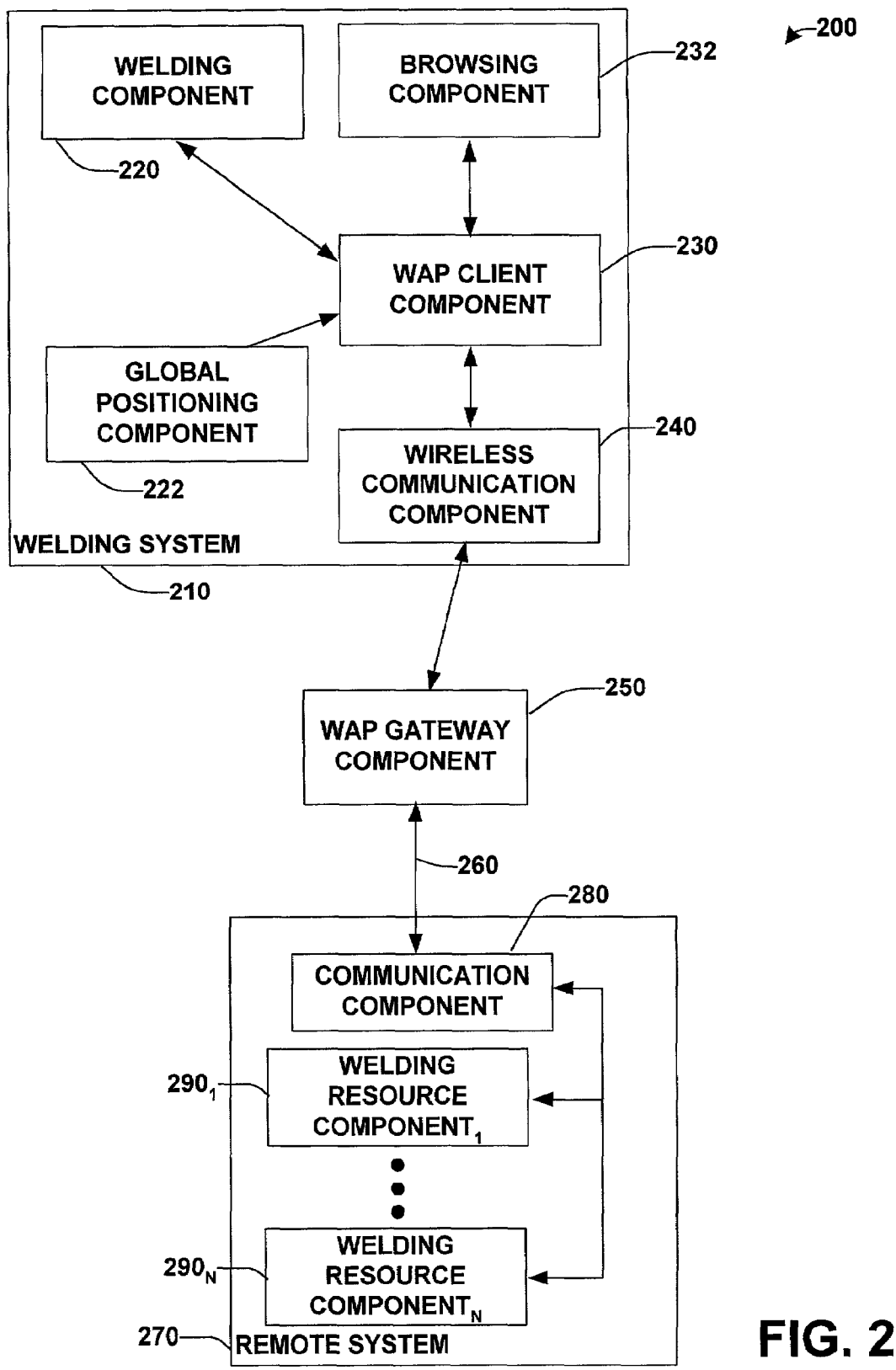
FIG. 2 is a schematic block diagram illustrating a wireless communications welding system in accordance with an aspect of the present invention.

Turning to FIG. 2, a wireless communication welding system 200 in accordance with an aspect of the present invention is illustrated. The wireless communication welding system 200 includes a welding system 210, a WAP gateway 250 and a remote system 270. The welding system 210 includes, a welding component 220, a WAP client component 230 and a wireless communication component 240.

The WAP gateway 250 is operatively coupled to the remote system 270 by one or more network connections 260. For example, these connections can support an Internet protocol (e.g., Internet Protocol version 6). One possible connection is supported via a phone connection to an Internet Service Provider (ISP) to the remote systems 270. Other possible connection(s) include, but are not limited to, a Local Area Network (LAN), a wide area network and/or a personal area network. It is noted that the welding system 210 and associated welding equipment (not shown) can communicate over a separate and isolated network (e.g., Arclink).

The WAP gateway component 250 provides a gateway between the welding system 210 and the remote system 270. The WAP gateway component 250 can communicate with the wireless communication component 240 of the welding system 210 utilizing, for example, SMS, CSD, GPRS and/or USSD. The WAP gateway component 250 can receive information from the welding system 210 (e.g., WML and/or WML script document(s)), process the information and send it out to the remote system 270 (e.g., via HTML document(s)). Further, the WAP gateway component 250 can receive information from the welding system 210 (e.g., HTML document(s)), process the information and send it to the welding system 210 (e.g., via WML and/or WML script document(s)). Information exchanged between the welding system 210 and the remote system 270 can include weld procedure(s), parameter(s), diagnostic information, error log(s), machine metric(s), system metric(s), specification(s), manual(s), machine enhancement(s), file(s) for specific user application and sensor feedback.

The WAP gateway component 250 can also determine, for example, an appropriate manner in which to transmit information to the welding system 210. For example, the WAP gateway component 250 can utilize cognitive technology facilitating negotiation with owner(s)/manager(s) of frequency channel(s) for temporary use of the frequency. In determining the appropriate manner in which to transmit information, the WAP gateway component 250 can also take into consideration user assigned priority and/or a predetermined priority of the information.

The remote system 270 includes a communication component 280 and one or more welding resource components that are collectively referred to as welding resource components 290. For example, the remote system 270 can be a web server having JAVA servlet(s) and Java Server Page(s) (JSP) invoking JAVA bean(s) on an application server. The welding resource components 290 can include welding resource(s) (e.g., welding procedure(s), component(s) associated with managing, ordering and/or monitoring welding consumable(s), component(s) associated with welding application development, component(s) associated with creating, managing, locating welding procedure(s), weld evaluation information and/or weld qualification information). The welding resource components 290 can further include information stored in relational database(s), data stored in hierarchical database(s), text document(s), graphical image(s), audio information, streaming video and other information associated with welding. For example, a user of the welding system 210 can have remote access to weld standard(s), testing criteria (e.g., bend radius and/or X-ray result(s)) and/or weld sample(s) via the remote system 270 in order to determine how to qualify a particular weld.

The welding system 210 can further include a browsing component 232 facilitating user interface of the welding system 210 with the remote system 270. The browsing component 232 can include a microbrowser, for example, for receiving WML document(s).

The welding system 210 can further include a global positioning component 222 facilitating identification of a geographical location of the welding system 210. For example, the global positioning component 222 can receive signal(s) from Global Positioning Satellites (GPS) and forward associated geographical location information to the WAP client component 250 for transmittal to the remote system 270. Thus, the global positioning component 222 can facilitate troubleshooting of the welding system 210 remotely by a welding application engineer by providing information regarding the geographical location of the welding system 210. For example, transmission of live streaming video to troubleshooter(s) at a manufacturer's location and/or field service office.

For example, a user of the welding system 210 can communicate with the remote system 270 via the browsing component 232 (e.g., microbrowser). The user can request information via the browsing component 232. The request for information is transmitted to the WAP client component 230 which formats the request for transmission to the WAP gateway component 250 (e.g., via WML and/or WML script document(s). The request is then communicated to the WAP gateway component 250 by the wireless communication component 240 (e.g., utilizing post second generation mobile communication technology). The WAP gateway component 250 can then process the request for information by, for example, examining welding resource component 290 via the network connection 260 (e.g., the Internet). The remote system 270 can send information back to the welding system 210 (e.g., via HTML document(s), WML script document(s) and/or WML document(s)) via the WAP gateway component 250. The WAP gateway component 250 can process (e.g., translate the information into WML document(s)) and forward information back to the wireless communication component 240. In turn, the wireless communication component 240 processes the information and forwards it onto the WAP client component 230. Finally, the WAP client component 230 can process (e.g., utilizing a WML scripting language) and present information to the user via the browsing component 232 (e.g., microbrowser).

Figure 2A:
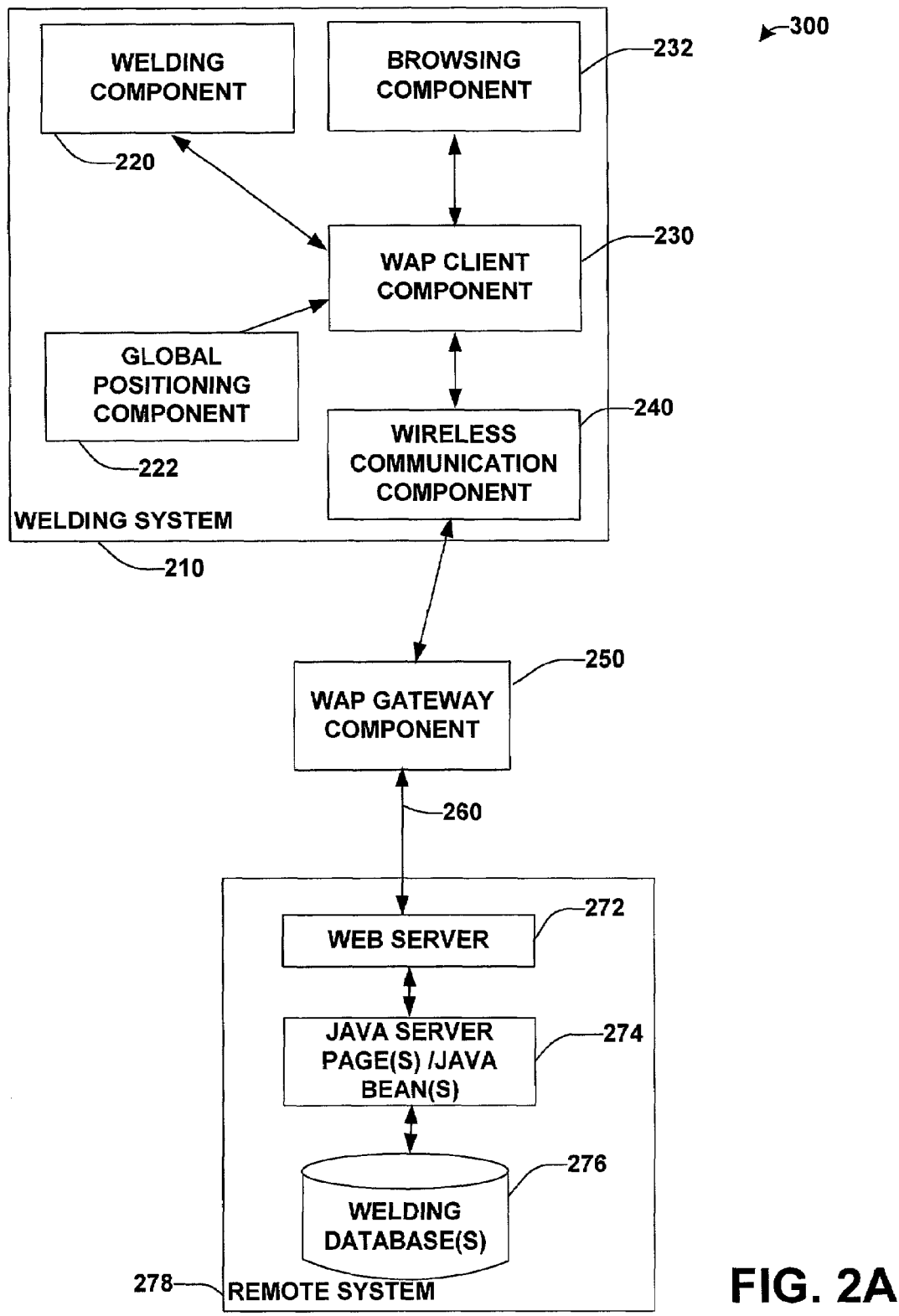
FIG. 2A is a schematic block diagram illustrating a wireless communications welding system in accordance with an aspect of the present invention.

Referring to FIG. 2A, a wireless communication welding system 300 in accordance with an aspect of the present invention is illustrated. The wireless communication welding system 300 includes the welding system 210, the WAP gateway 250 and a remote system 278. The remote system 278 includes a web server 272, JAVA server page(s)/JAVA bean(s) 274 and welding database(s) 276 (e.g., related to welding knowledge, welding part(s) and/or Enterprise Resource Planning (ERP)).

FIGS. 2B, 8, 9 and 10 illustrate methodologies for providing various aspects of establishing wireless communications in a welding system in accordance with the present invention. The methods comprise a group of actions or processes represented by blocks. While, for purposes of simplicity of explanation, the methodologies are shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Figure 2B:
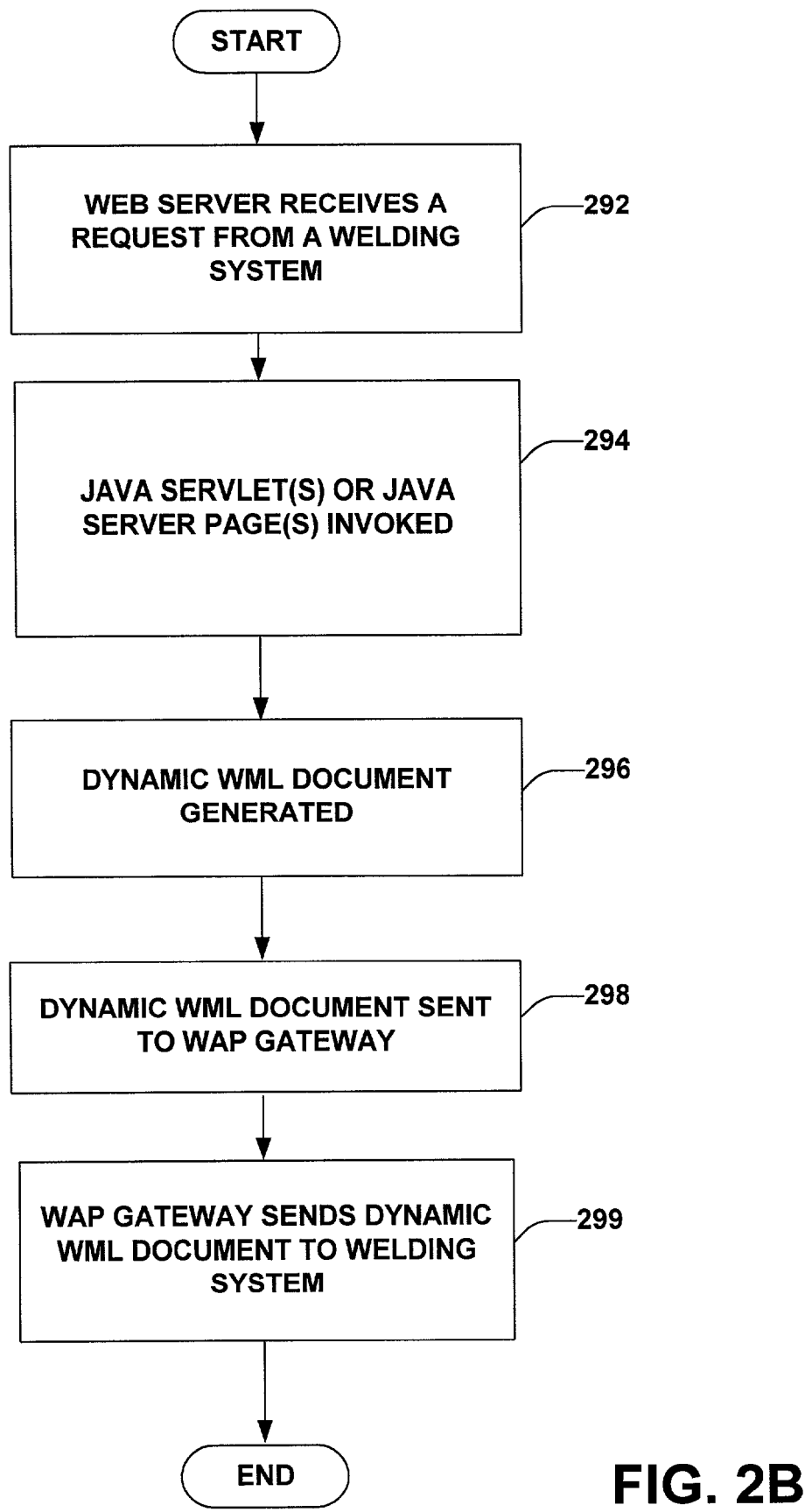
FIG. 2B is a flow chart diagram illustrating a methodology of a wireless communications welding system in accordance with an aspect of the present invention.

Turning to FIG. 2B, a methodology for providing wireless communication in a welding system in accordance with the present invention is provided. Beginning at 292, a web server (e.g., web server 272) receives a request from a welding system (e.g., welding system 210). At 294, Java servlet(s) or Java server page(s) are invoked (e.g., JAVA server page(s)/JAVA bean(s) 274). At 296, a dynamic WML document is generated by the web server (e.g., web server 272), for example, based at least in part upon information stored in the welding database(s) 276. At 298, the dynamic WML document is sent to the WAP Gateway (e.g., WAP Gateway Component 250). At 299, the WAP Gateway sends the dynamic WML document to the welding system (e.g., welding system 210).

Figure 3:
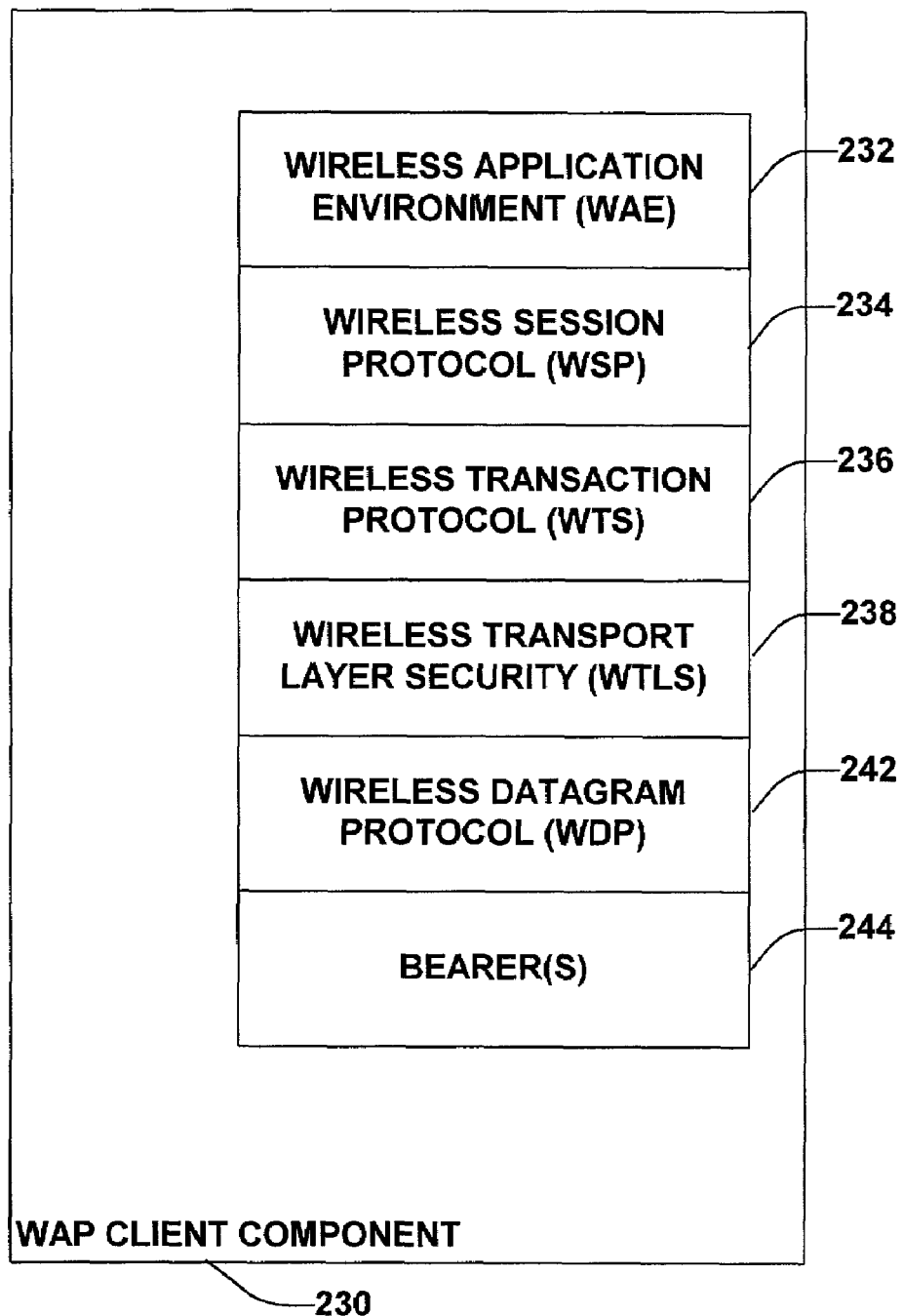
FIG. 3 is a block diagram illustrating a WAP client component.

Referring to FIG. 3, a hierarchical representation of a WAP client component 230 is illustrated. The WAP client component 230 can include a Wireless Application Environment (WAE) 232, a Wireless Session Protocol (WSP) 234, a Wireless Transaction Protocol 236, a Wireless Transport Layer Security (WTLS) 238, a Wireless Datagram Protocol (WDP) 242 and bearer(s) 244.

The Wireless Application Environment (WAE) 232 can define, for example, a user interface. The Wireless Application Environment (WAE) 232 can include a scripting language (e.g., a WML scripting language) for utilizing information (e.g., WML document(s)) received by the WAP client component 230.

The Wireless Session Protocol (WSP) 234 facilitates communication between one of two session services: a connection oriented session service operating above the Wireless Transaction Protocol 236 and a connectionless service operating above the Wireless Datagram Protocol (WDP) 242.

The Wireless Transaction Protocol 236 runs on top of a datagram service (e.g., user Datagram Protocol (UDP)) and is part of a standard suite of TCP/IP protocols. The Wireless Transaction Protocol 236 provides a simplified protocol suitable for low bandwidth mobile station(s) and generally offers three classes of transaction service: unreliable one way request, reliable one way request and reliable two way request respond. The Wireless Transaction Protocol 236 is adapted to optimize the transfer of information between the welding system 210 and the remote system 270.

The Wireless Transport Layer Security (WTLS) 238 facilitates secure communication between the welding system 210 and the WAP gateway component 250. The Wireless Transport Layer Security (WTLS) 238 can incorporate security features that based upon the established Transport Layer Security (TLS) protocol standard. The Wireless Transport Layer Security (WTLS) 238 can further include data integrity checks, privacy between the welding system 210 and the WAP gateway component 250.

Wireless Datagram Protocol (WDP) 242 facilitates hierarchically higher layer(s) of the WAP client component 230 to be independent of the physical layer (e.g., bearer(s) 244) of the WAP client component 230. The Wireless Datagram Protocol (WDP) 242 adapts the bearer(s) 244 thus presenting a consistent data format to higher layer(s) of the WAP client component 230.

The bearer(s) 244 facilitate the transfer of information from the WAP client component 230 to other device(s), for example, the WAP gateway component 250. The bearer(s) 244 can facilitate the transfer of information via different formant(s), for example, depending upon relative cost(s), amount(s) of information to be transferred and/or priority. The bearer(s) 244 can utilize Unstructured Supplementary Service Data (USSD) which generally facilitates communication of information which is primarily numeric data and/or when speed of access is an important consideration. USSD is not a store and forward service and is session-oriented such that when a user accesses a USSD service, a session is established and the radio connection stays open until the user, application, or time out releases it. Further, the bearer(s) 244 can utilize Short Message Service (SMS), Circuit Switched Data (CSD) and/or General Packet Radio Service (GPRS).

Figure 4:
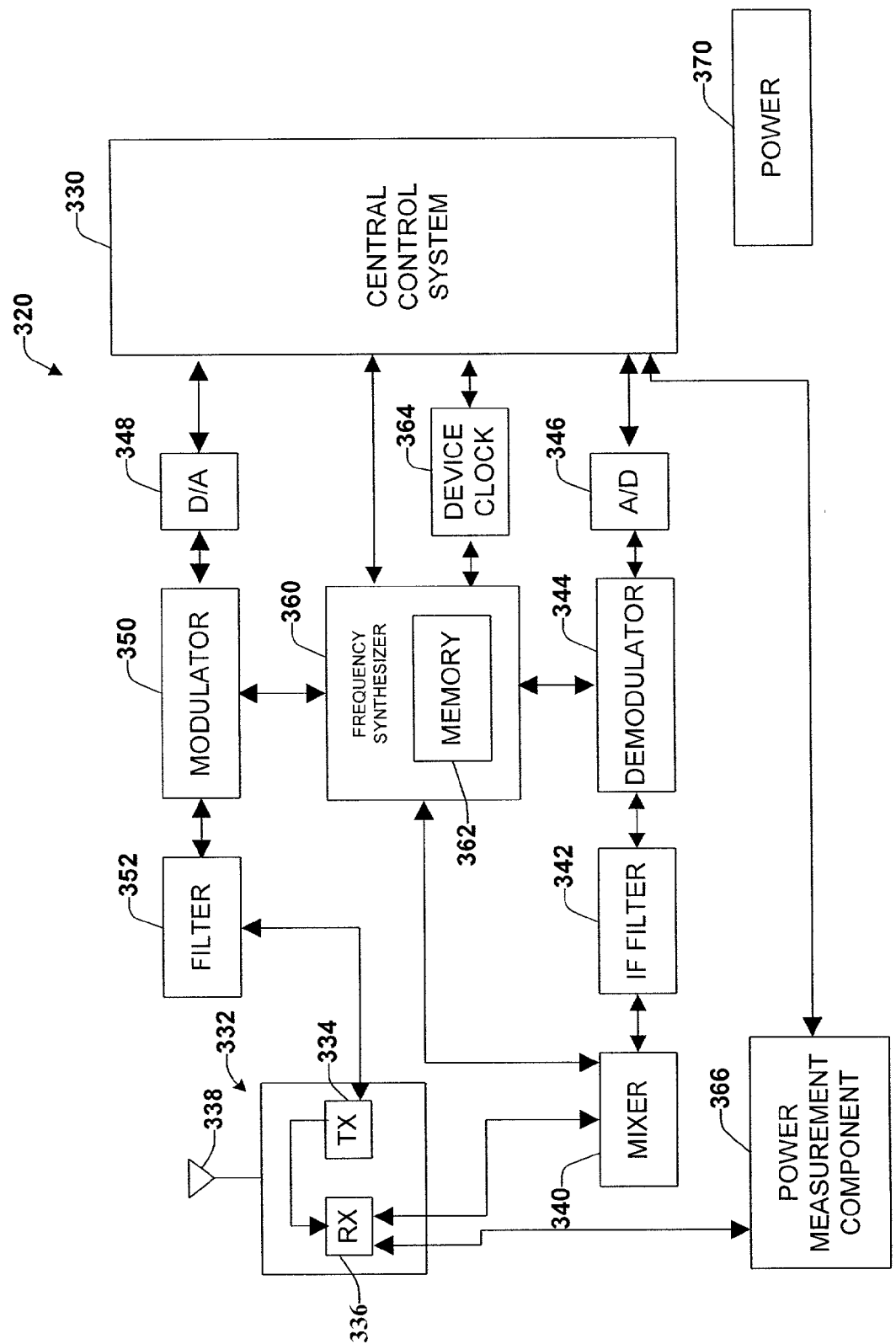
FIG. 4 is a schematic block diagram of a wireless communications system in accordance with an aspect of the present invention.

FIG. 4 provides a schematic representation of the wireless communication component 240 according to one particular aspect of the present invention, wherein a central control system 330 is responsible for controlling general operations of the wireless communication component 240. The central control system 330 can include a processor or the like that is programmed to control and operate various components within the wireless communication component 240 in order to carry out various functions described herein. The manner in which the processor can be programmed to carry out the functions relating to the present invention will be readily apparent to those having ordinary skill in the art based on the description provided herein.

The wireless communications component 240 includes a transceiver 332 having transmitting circuitry 334 and receiving circuitry 336 that are both coupled to an antenna 338. The receiver 336 receives transmissions through the antenna 338, which is transmitted through a mixer 340, filtered by an intermediate frequency (IF) filter 342 and demodulated by a demodulator 344. The transmission is then digitized through an A/D converter 346 for processing by the central control system 330. Transmissions are transmitted from the central control system 330 through a D/A converter 348 to a modulator 350 and a filter 352 to the transmitter 334 out through the antenna 338. A frequency synthesizer component 360 contains a memory component 362. The frequency synthesizer component 360 cooperates with the central control system 330 and a device clock 364 to provide frequency hopping for the wireless communications device 110. The memory component 362 may include a plurality of register banks for storing synthesizer codes that are employed to facilitate frequency hopping, when applicable. Alternatively, the register banks may reside in the central control system 330 (e.g., in a memory component, onboard registers or memory in a processor or in separate register components). The frequency synthesizer component 360 is also operatively coupled to the modulator 350, the demodulator 344 and the mixer 340 to provide a frequency oscillation component for transmitting and receiving communications. A power measurement component 366 is operatively coupled to the receiver 334 and provides transmission power measurement information to the central control system 330. Power is provided to the central control system 330 and other components forming the wireless communication component 240 by a power component 370, such as a battery power module, line power or the like, for example.

Figure 5:
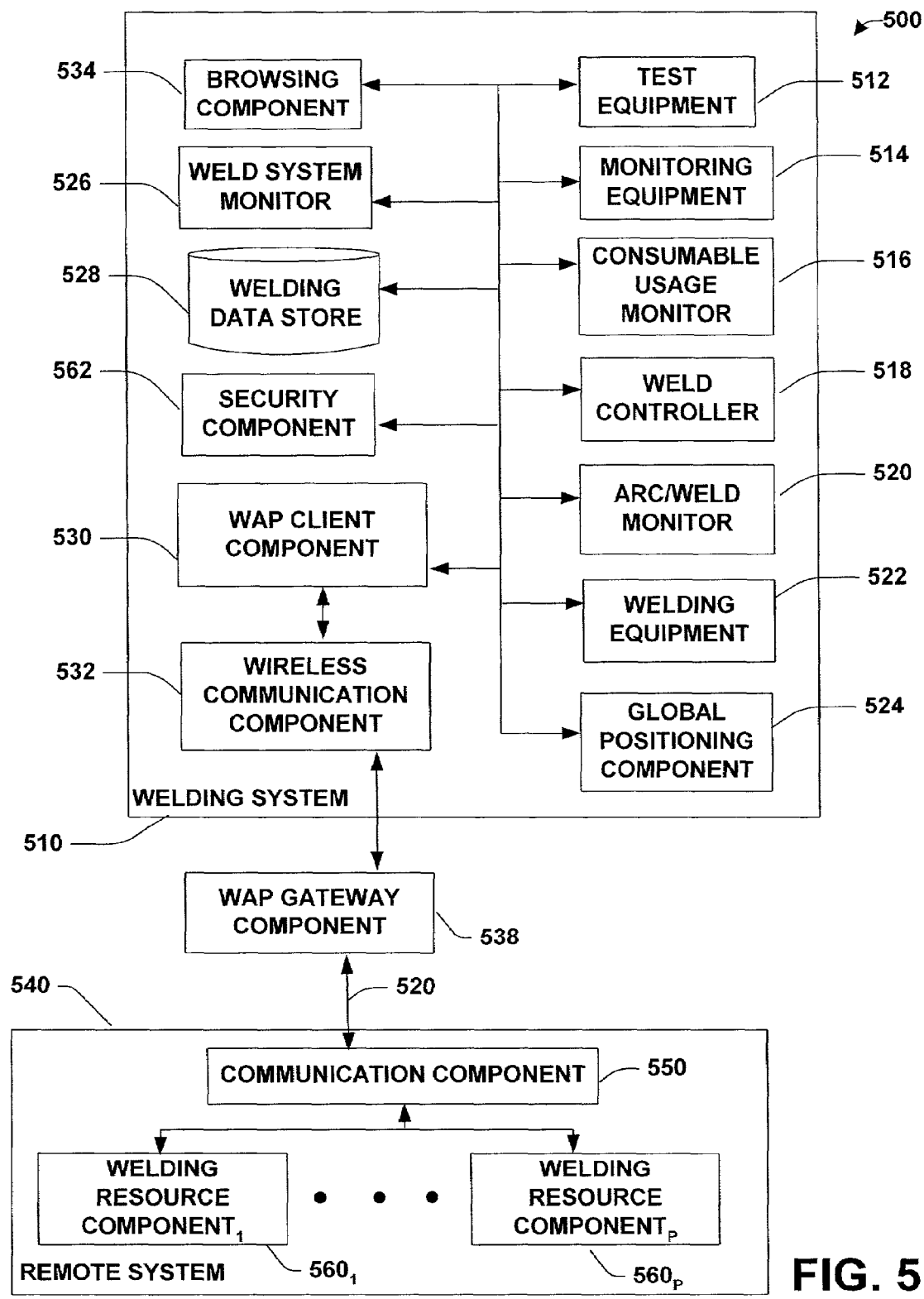
FIG. 5 is a schematic block diagram illustrating a wireless communications system for in accordance with an aspect of the present invention.

Next, referring to FIG. 5, a wireless communication welding system 500 in accordance with an aspect of the present invention is illustrated. The wireless communication welding system 500 includes a welding system 510, a WAP gateway component 538 and a remote system 540.

The welding system 510 can include a wireless communication component 532, a WAP client component 530, a welding data store 528, a weld system monitor 526, test equipment 512 (e.g., ohm meter, voltage meter and/or current meter), monitoring equipment 514 (e.g., digital camera and/or streaming video camera image(s) of weld(s) and/or welding system 510), consumable usage monitor 516, weld controller 518 and welding equipment 522.

The welding system 510 can, optionally, further include a global positioning component 524 facilitating identification of a geographical location of the welding system 510. The global positioning component 524 can further facilitate identification of a physical location of a weld. For example, the physical location of weld(s) can be communicated to the remote system 540 and stored for future reference (e.g., to assist troubleshooting of a pipeline).

The WAP client component 530 facilitates transfer of information between component(s) of the welding system 510 and the remote system 540 via the WAP Gateway component 538. The WAP client component 530 can receive information from component(s) of the welding system (e.g., browsing component 534) and place it into a format, for example, a WML document, for transmission to the remote system 540) via the wireless communication component 532 and the WAP gateway component 538. The WAP client component 530 can receive information (e.g., WML and/or WML script document(s)) from the remote system 540 via the wireless communication component 532 and the WAP gateway component 538.

The wireless communication component 532 facilitates communication between the welding system 510 and the WAP gateway component 538. The wireless communication component 532 can utilize post second generation mobile communications technology (e.g., 3G) to communicate with the WAP gateway component 538. The wireless communication component 532 can include software that is reprogrammable. For example, the wireless communication component 532 can determine, based at least in part upon information from the global positioning component 524, user preference(s) (e.g., cost(s) associated with communication modalities and/or priority of communication) and/or available communication modalities, which software to download (e.g., via the wireless communication component 532). The wireless communication component 532 can further communicate via one channel and/or shift among multiple channels, for example, depending on the type of communication being performed (e.g., voice, data and/or high-speed data). The wireless communication component 532 can further be adapted to utilize a particular communications modality (e.g., high-speed satellite modem) based upon, for example, a priority level. Further, the wireless communication component 532 can be adapted to perform cognitive function(s) to facilitate communications. For example, the wireless communication component 532 can determine frequencies available for communication (e.g., temporary use), cost(s) associated with communication on each of the frequencies and/or negotiate usage rights with the owner(s) of the channels. Additionally, the wireless communication component 532 can further monitor the quality of transmission and/or receipt of information and adaptively modify the transmission frequency.

The welding data store 528 can store information associated with welding diagnostics stored on the remote system 510 accessible via the wireless communication component 532. For example, the welding data store 528 can provide hyperlinks to welding diagnostic resource(s) available via the Internet to an operator of the welding system 510 (e.g., accessible via the browsing component 534). Further, the welding data store 528 can store information associated with the welding system 510 (e.g., welder serial number, welder model number, welder build date and/or welder software version identifier) and/or information associated with component part(s) of the welding system 510 (e.g., component part identifier(s), component version identifier(s) and/or component software version identifier(s)). Information associated with the welding system 510 stored in the welding data store 528 can be transmitted via the wireless communication component 532 to the remote system 540. For example, the remote system 540 can query the welding data store 528 for information associated with a component printed circuit board to determine a software version number to facilitate the remote system 540 in determining likely cause(s) of welding system fault(s) and/or alarm(s).

The weld system monitor 526 collects information relating to the welding system 510. This information may include operator time in/out shift information and information relating to maintenance of the welding system 510, for example.

The consumable usage monitor 516 is adapted to monitor welding consumable(s) (e.g., wire, consumable electrode, gas and/or flux) that have been consumed by the welding system 510 and/or consumable(s) remaining (e.g., wire left on a drum). For example, the remote system 540 can utilize information from the consumable usage monitor 516 to facilitate ordering of consumable(s) via an Enterprise Java Bean (EJB) using Java Database Connectivity (JDBC). Optionally, the welding system 510 can have an arc/weld monitor 520 that is adapted to monitor other aspects of the welding process, for example, quality and/or production control.

The welding equipment 522 can include a power source, a gas controller, a wire feeder, a contact tip, a dresser, a gas mixer, a gas sneezer, a gas controller, a clamp actuator, a robot arm/beam/torch manipulator, a laser seam tracker, a wire drive and gun, a water cooler, a welder, a part handler, a torch travel and a user control.

The WAP gateway component 538 is operatively coupled to the remote system 540 by one or more network connections 570. For example, these connections can support an Internet protocol (e.g., Internet Protocol version 6). One possible connection is supported via a phone connection to an Internet Service Provider (ISP) to the remote system 540. Other possible connection(s) include, but are not limited to, a Local Area Network (LAN), a wide area network, satellite modem and/or a personal area network. It is noted that the welding system 510 and associated welding equipment 522 can communicate over a separate and isolated network (e.g., Arclink).

The WAP gateway component 538 provides a gateway between the welding system 510 and the remote system 540. The WAP gateway component 538 can communicate with the wireless communication component 532 of the welding system 510 utilizing, for example, SMS, CSD, GPRS and/or USSD. The WAP gateway component 538 can receive information from the welding system 510 (e.g., WML and/or WML script document(s)), process the information and send it out to the remote system 540 (e.g., via HTML document(s)). Further, the WAP gateway component 538 can receive information the welding system 510 (e.g., HTML document(s)), process the information and send it to the welding system 510 (e.g., via WML and/or WML script document(s)). For example, the remote system 540 and the welding system 510 can communicate firmware file(s), data acquisition file(s), welding program(s), welding procedure(s), audio application(s), voice over Internet Protocol, email(s), chat application(s), instant message application(s), remote data monitoring information, remote control, remote task invocation and remote point-of-sale information.

The WAP gateway component 538 can also determine, for example, an appropriate manner in which to transmit information to the welding system 510. For example, the WAP gateway component 538 can utilize cognitive technology facilitating negotiation with owner(s)/manager(s) of frequency channel(s) for temporary use of the frequency. In determining the appropriate manner in which to transmit information, the WAP gateway component 538 can also take into consideration user assigned priority and/or a predetermined priority of the information.

The remote system 540 includes a communication component 550 and one or more welding resource components that are collectively referred to as welding resource components 560. The welding resource components 560 can include welding resource(s) (e.g., welding procedure(s), component(s) associated with managing, ordering and/or monitoring welding consumable(s), component(s) associated with welding application development, component(s) associated with creating, managing, locating welding procedure(s), weld evaluation information and/or weld qualification information). The welding resource components 560 can further include information stored in relational database(s), data stored in hierarchical database(s), text document(s), graphical image(s), audio information, streaming video and other information associated with welding. For example, a user of the welding system 510 can have remote access to weld standard(s), testing criteria (e.g., bend radius and/or X-ray result(s)) and/or weld sample(s) via the remote system 540 in order to determine how to qualify a particular weld.

The welding system 510 can further include a browsing component 534 facilitating user interface of the welding system 510 with the remote system 540. The browsing component 534 can include a microbrowser adapted to receiving, for example, WML document(s).

The welding system 510 can, optionally, include a security component 562 that facilitates secure communication between the welding system 510 and the remote system 540. Given that welding information may be transferred over public networks such as the Internet, the security component 562 can provide encrypted data communications along with authentication and/or authorization services between a remote system 540 and the welding system 510. Authentication refers to a determination that a purported user or welding system 510 is whom they claim to be. For example, a user can utilize a password login and/or a digital signature. Authorization is the process of verifying that a user or welding system 510 has been authorized by the remote system 540 to access welding information. Encryption is the conversion of data into a form, such as a ciphertest, that is not easily understood by unauthorized agents. For example, authentication, authorization, and non-repudiation may be established utilizing a Public Key Infrastructure (PKI) and X.509 Public Key Infrastructure Certificates to provide authentication and message integrity. Further, a Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

The security component 562 can further employ encryption that can be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETF) and in other sources.

Negotiations can occur between the security component 562 of the remote system 540 and the welding system 510. These negotiations may be utilized to establish a secure (e.g., encrypted) data channel, for example, between the TCP/IP drivers (not shown) of the welding system 510 and the remote system 540.

The security component 562 can further define access rights based upon the type of user/welder and/or the particular user/welder. For example, a user having a single welder can be permitted access to welding information accessible to substantially all users while a user having hundreds of welders (e.g., automated factory) possibly spread across various geographical locations can be permitted access to welding information accessible to substantially all users along with information accessible to users associated with a particular entity (e.g., welding procedure(s) for particular part number(s) and/or plant location(s)). The security component 562 thus facilitates secure communication and/or validates access of information based at least in part upon access rights granted to the welding system 510 and/or a user.

Figure 6:
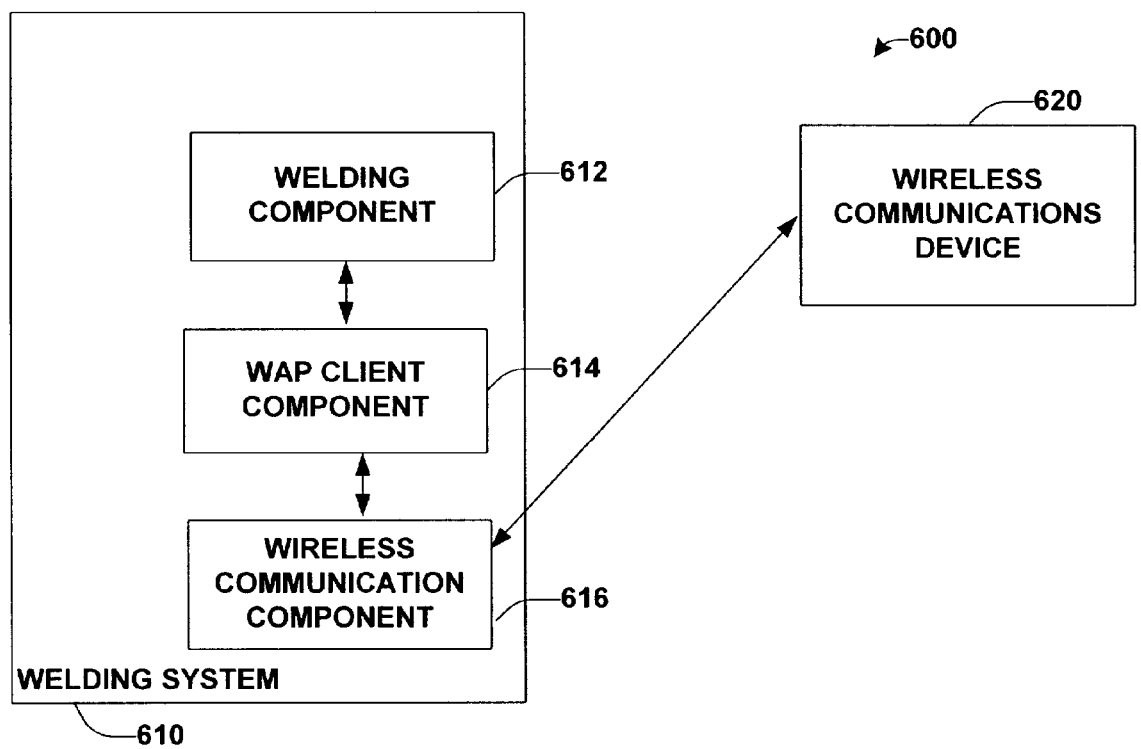
FIG. 6 is a schematic block diagram illustrating a system for wireless communication between a welding system and a wireless communications device in accordance with an aspect of the present invention.

Turning to FIG. 6, a system 600 for wireless communication between a welding system and a wireless communications device in accordance with an aspect of the present invention is illustrated. The system 600 includes a wireless communications device 620 (e.g., a personal digital assistant, such as a Palm Pilot, adapted for WAP mobile communications) and a welding system 610. The welding system 610 includes a welding component 612, a WAP client component 614 and a wireless communications component 616.

A user (e.g., weld engineer) utilizing a wireless communications device 620 (e.g., (e.g., personal digital assistant, such as a Palm Pilot adapted for WAP mobile communications) can communicate with a welding system 610 in order to extract welding information to facilitate welding system maintenance, weld evaluation, troubleshooting and/or servicing. By establishing reliable wireless communications with the welding system 610, cable management problems inherent in the prior art are reduced. For example, cabling requirements for a welding system 610 on a construction site can significantly be reduced resulting in decreased costs and potentially increased site safety. Additionally, problems associated with cables in the prior art, such as unreliable cable terminations, are greatly reduced.

Figure 7:
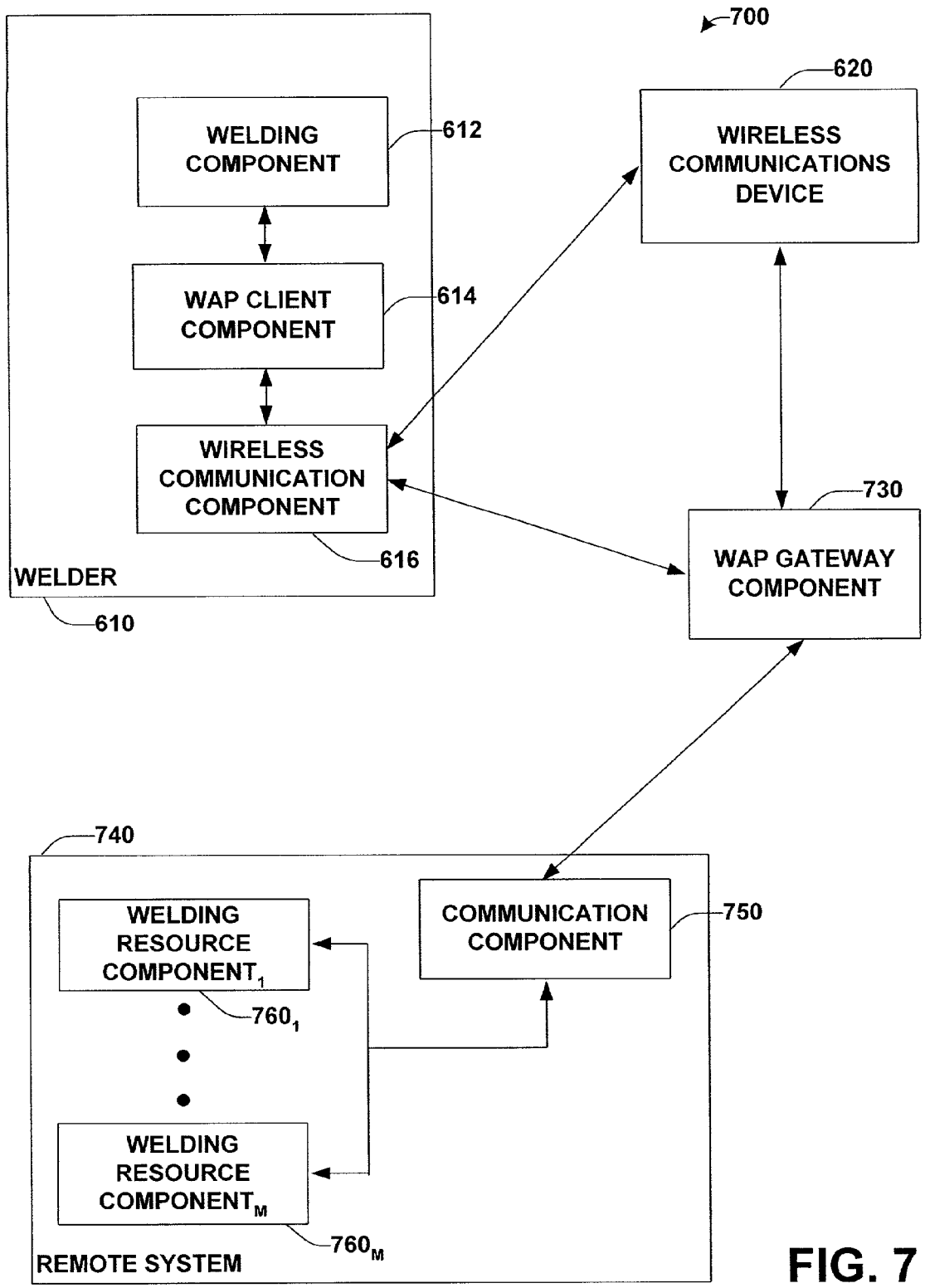
FIG. 7 is a schematic block diagram illustrating a wireless communications system in accordance with an aspect of the present invention.

Turning to FIG. 7, a system 700 for wireless communication between a welding system, a wireless communications device and/or a remote system in accordance with an aspect of the present invention is illustrated. The system 700 includes a welding system 610, a wireless communications device 620, a WAP gateway component 730 and a remote system 740.

The WAP gateway component 730 provides a gateway between the welding system 610 and the remote system 740. The WAP gateway component 730 can communicate with the wireless communication component 616 of the welding system 610 utilizing, for example, SMS, CSD, GPRS and/or USSD. Information exchanged between the WAP Gateway component 730 and the wireless communication component 616 can be in a variety of formats and can include, but is not limited to, WML as well as other formats. The WAP gateway component 730 can exchange information with the remote system 740. Information exchanged between the WAP gateway component 730 and the remote system 740 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, ActiveX, XML, PDF, EDI, WML, WML script as well as other formats.

The WAP gateway component 730 can also determine, for example, an appropriate manner in which to transmit information to the welding system 610. For example, the WAP gateway component 730 can utilize cognitive technology facilitating negotiation with owner(s)/manager(s) of frequency channel(s) for temporary use of the frequency. In determining the appropriate manner in which to transmit information, the WAP gateway component 730 can also take into consideration user assigned priority and/or a predetermined priority of the information.

The remote system 740 includes a communication component 750 and one or more welding resource components that are collectively referred to as welding resource components 760. The welding resource components 760 can include welding resource(s) (e.g., welding procedure(s), component(s) associated with managing, ordering and/or monitoring welding consumable(s), component(s) associated with welding application development, component(s) associated with creating, managing and/or locating welding procedure(s) and/or component(s) associated with weld evaluation and/or weld qualification). For example, a user utilizing the wireless communications device 620 (e.g., a personal digital assistant, such as a Palm Pilot, adapted for WAP mobile communications) can retrieve information from the welding system 610 (e.g., diagnostic information or failure records). The user can also send information to the welding system 610 (e.g., parameters).

Further, in accordance with the present invention, the remote system 740 can serve as a repository of weld procedures for a factory. Specific weld procedures can be loaded into the welding system 610 in response to a time-based event (e.g., work shift change) or other event (e.g., proximity switch) via wireless communication. Thus, an entire factory assembly line can be automated to weld a specific part at one point in time, and, at a different point in time, to weld a different part. The timing and changing of the weld procedure can be transmitted wireless by the remote system 740 to one or a plurality of welding system(s) 610. Further, the remote system 740 can retrieve information from the welding system 610 (e.g., wire usage and error logs) and take action upon the information obtained (e.g., place an order for consumables). The remote system 740 can include machinery in a plant production line, supervisory systems, inventory systems, quality control systems and maintenance systems associated with welding system(s). The remote system 740 can further facilitate user welding application queries (e.g., selection of welding procedure(s) based upon user need(s)).

Figure 8:
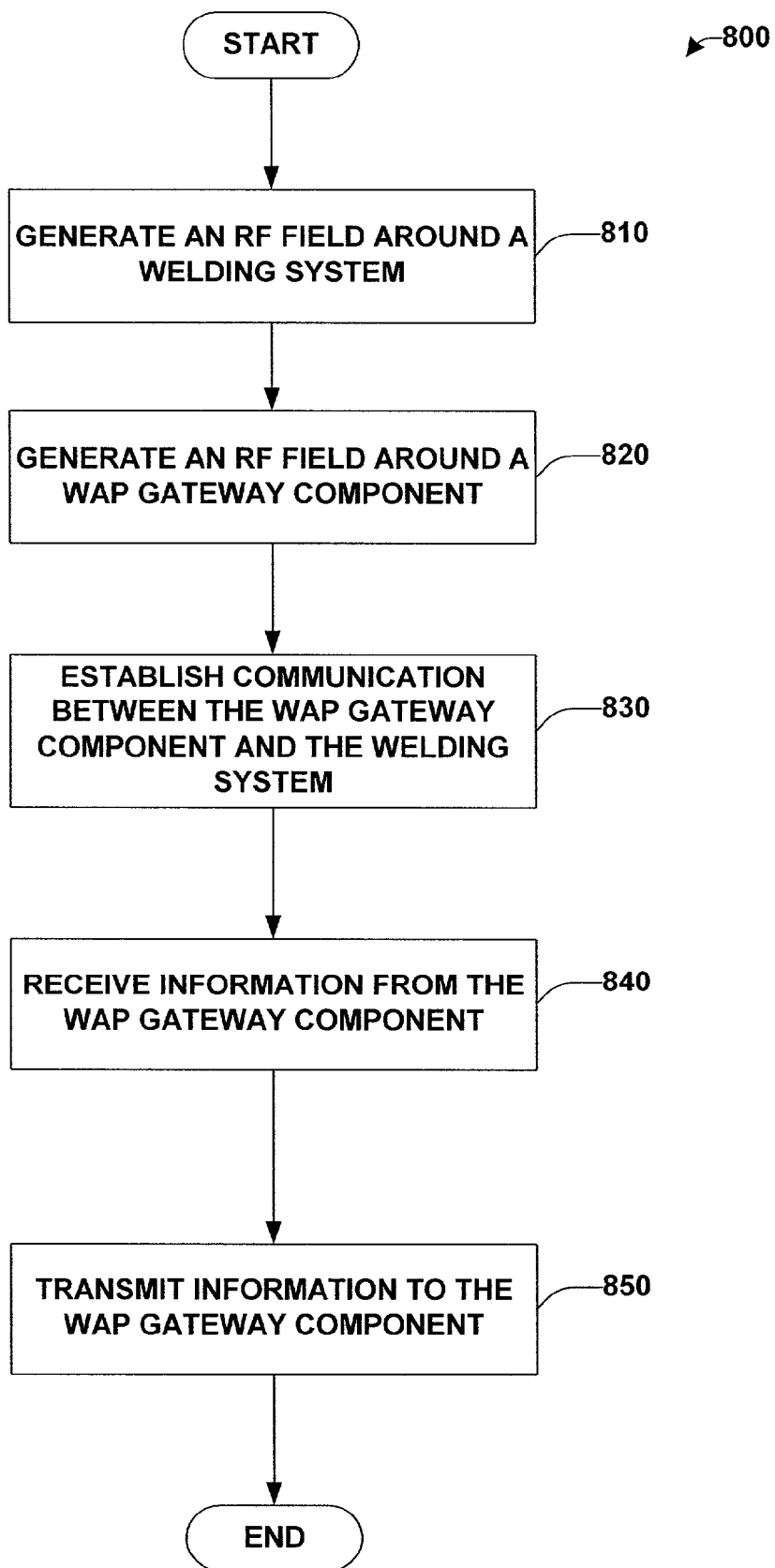
FIG. 8 is a flow chart diagram illustrating a methodology for providing wireless communication in a welding system in accordance with the present invention.

Turning now to FIG. 8, a methodology for providing wireless communication in a welding system in accordance with the present invention is provided. Beginning at 810, an RF field is generated around a welding system. At 820, an RF field is generated around a WAP gateway component. At 830, communications are established between the welding system and the WAP gateway component. At 840, information (e.g., parameters) is wirelessly received from the WAP gateway component. At 840, information (e.g., diagnostic information or failure record) is transmitted to the WAP gateway component.

Figure 9:
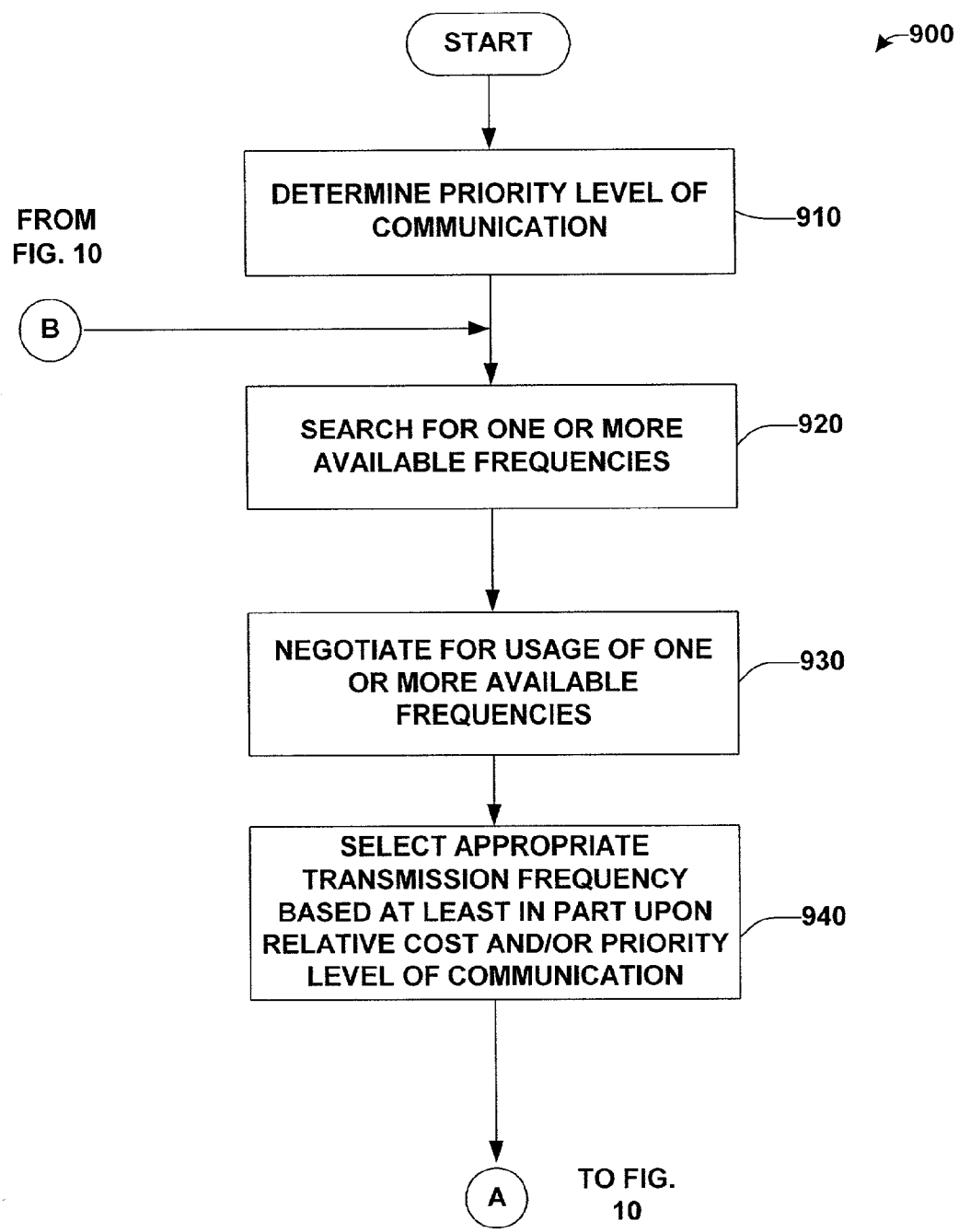
FIG. 9 is a flow chart diagram illustrating a methodology for providing wireless communication in a welding system in accordance with the present invention.
Figure 10:
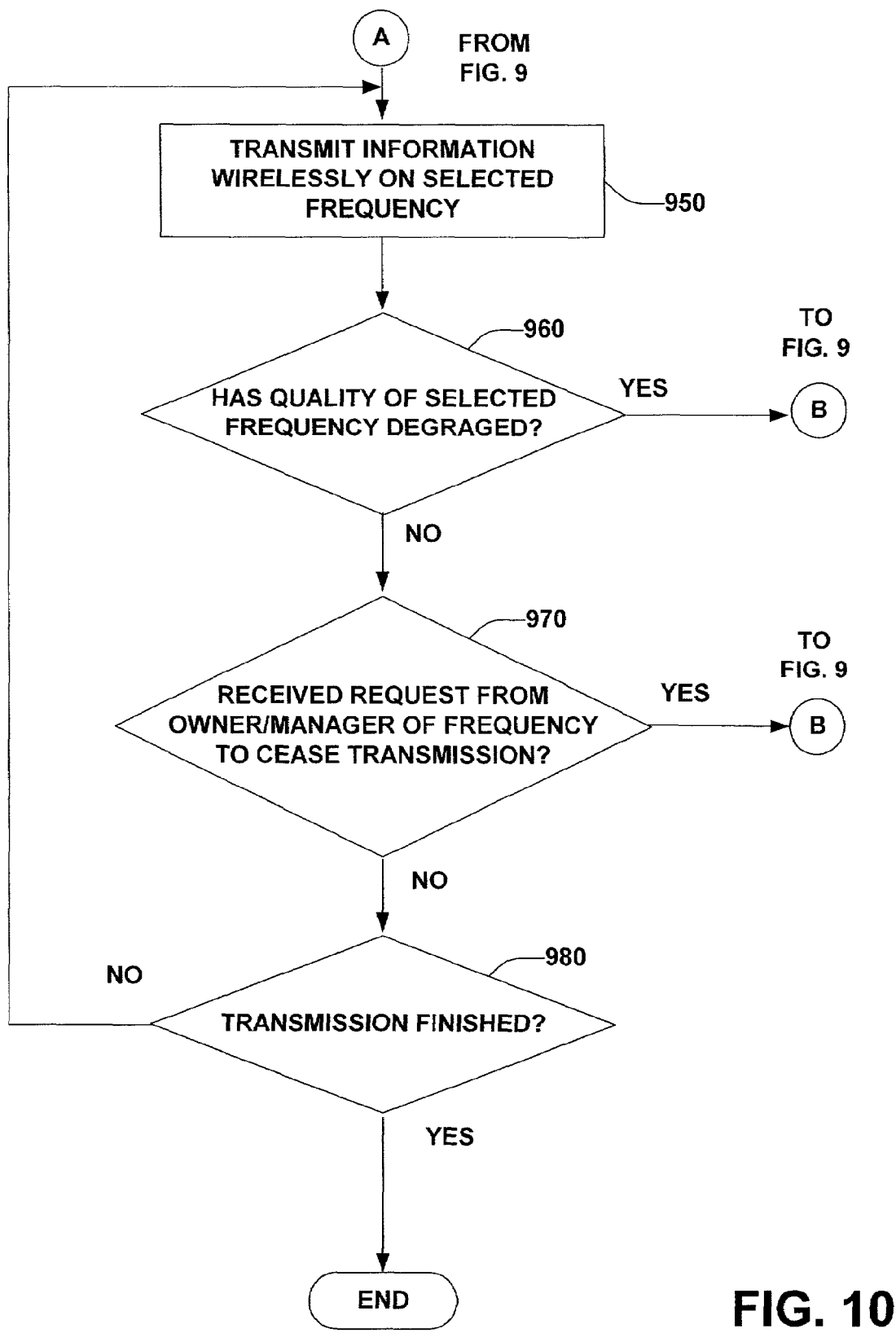
FIG. 10 is a flow chart further illustrating the methodology of FIG. 9.

Referring to FIGS. 9 and 10, a methodology for providing wireless communication in a welding system in accordance with the present invention is provided. Beginning at 910, a priority level of communication is determined. At 920, a search is performed for one or more available frequencies. At 930, negotiations are conducted for usage of one or more available frequencies (e.g., with owner/manager of frequency). At 940, an appropriate transmission frequency is selected based, at least in part, upon relative cost and/or priority level of communication. At 950, information is transmitted wirelessly on the selected frequency. At 960, a determination is made whether the quality of the selected frequency has degraded (e.g., beyond a threshold limit). If the determination at 960 is YES, processing continues at 920. If the determination at 960 is NO, processing continues at 970. At 970, a determination is made whether a request has been received from the owner/manager of the selected frequency to cease transmission. If the determination at 970 is YES, processing continues at 920. If the determination at 920 is NO, processing continues at 980. At 980, a determination is made whether the transmission has finished. If the determination at 980 is NO, processing continues at 950. If the determination at 980 is YES, no further processing occurs.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding system, comprising:
   a welding component facilitating welding;
   a wireless client component facilitating transfer of information associated with welding between the welding component and at least one other device, the welding component detects an error and initiates a troubleshooting request via the wireless client component;
   a wireless communication component facilitating wireless communication between the wireless client component and at least one other remote device located at a geographical site remote to the welding system, the remote device receives the request and implements a dynamic procedure that automatically adjusts the welding component, the procedure based on evaluation of welding status received from the welding component via the wireless client component; and
   a global positioning component facilitating locating a geographical location of the welding system.

2. The welding system of claim 1, the wireless communication component adapted to communicate with the at least one other device utilizing CDMA systems capacity.

3. The welding system of claim 1, the transfer of information being via at least one of a Wireless Mark-up Language (WML) document and a Wireless Mark-up Language script (WML script) document.

4. The welding system of claim 1, further comprising a browsing component.

5. A system, comprising:
   a welding system having a welding component facilitating welding, a wireless client component and a wireless communication component, the wireless communication component facilitating wireless communication between the wireless client component and at least one other remote device located at a geographical site remote to the welding system, the welding component detects an error and initiates a troubleshooting request via the wireless client component, the remote device received the request and implements a dynamic procedure that automatically adjusts the welding component, the procedure based on evaluation of welding status received from the welding component via the wireless client component;
   a wireless gateway component, the wireless client component facilitating wireless transfer of information associated with welding between the welding system and the wireless gateway component, the wireless gateway component communicates with the remote system via at least one of a wide area network, the Internet, and a personal area network; and
   a security component that encrypts the wireless transfer of information in conjunction with access rights based on general and specific attributes of the welding system.

6. The system of claim 5, further comprising a remote system having a communication component and at least one welding resource component, the wireless gateway component facilitating communication between the welding system and the remote system.

7. The system of claim 6, the remote system further comprising at least one of a web server, servlet, a server page, a software widget, and a database.

8. The system of claim 6, the welding system and the remote system communicating at least one of a firmware file, a data acquisition file, a welding program, a welding procedure, an audio application, a voice over Internet Protocol, an email, a chat application, an instant message application, remote data monitoring information, remote control, remote task invocation and remote point-of-sale information.

9. The system of claim 6, the at least one welding resource component further comprising at least one of welding procedure(s), a component associated with managing a welding consumable, a component associated with ordering a welding consumable, a component associated with monitoring welding consumable, a component associated with welding application development, a component associated with creating a welding procedure, a component associated with managing a welding procedure, a component associated with weld evaluation, a component associated with weld qualification and a component associated with locating a welding procedure.

10. The system of claim 5, the welding system further comprising a browsing component.

11. The system of claim 5, the welding system further comprising a global positioning component.

12. The system of claim 11, the global positioning component facilitating identification of a physical location of a weld.

13. The system of claim 5, the welding system further comprising at least one of test equipment, monitoring equipment, a consumable usage monitor, a weld controller, an arc/weld monitor and a welding data store.

14. The system of claim 5, the welding system further comprising welding equipment comprising at least one of a power source, a gas controller, a wire feeder, a contact tip, a dresser, a gas mixer, a gas sneezer, a gas controller, a clamp actuator, a robot arm/beam/torch manipulator, a laser seam tracker, a wire drive and gun, a water cooler, a welder, a part handler, a torch travel and a user control.

15. The system of claim 5, the wireless communication component adapted to communicate with the wireless gateway component utilizing CDMA systems capacity.

16. The system of claim 5, at least one of the wireless communication component and the wireless gateway component utilizing at least one of a post second generation service and a third generation service.

17. The system of claim 5, the transferred information being at least one of weld procedures, parameters, diagnostic information, error logs, machine metrics, system metrics, specifications, manuals, machine enhancements, files for specific user application and sensor feedback.

18. The welding system of claim 5, the transfer of information being via at least one of a WML document and a WML script document.

19. The welding system of claim 5, the wireless communication component further comprising reprogrammable software based at least in part upon one of user preference and available communication modalities.

20. The welding system of claim 5, the security component facilitates secure communication utilizing at least one of a password login, a digital signature, data encryption, an authentication service and an authorization service.

21. A method for providing wireless communication in a welding system comprising:

generating a first RF field around a welding system, the welding system comprising welding equipment comprising at least one of a gas controller, a wire feeder, a contact tip, a dresser, a gas mixer, a gas sneezer, a gas controller, a clamp actuator, a robot arm/beam/torch manipulator, a laser seam tracker, a wire drive and gun, a water cooler, a welder, a part handler, a torch travel or a user control;

generating a second RF field around a wireless gateway component located at a site remote to the welding system, wherein the gateway component negotiates and selects a frequency channel for temporary use based on type and priority of information to be communicated;

establishing communication through the selected frequency channel between the welding system and the wireless gateway component, wherein the communication is initiated by the welding component to send a troubleshooting request on detecting an error;

receiving information from the wireless gateway component; and, transmitting information to the wireless gateway component.

22. A welding system, comprising:

means for facilitating welding;

means for facilitating wireless transfer of information associated with welding between a welding component and at least one other device located at a site geographically remote from the means for facilitating welding, wherein the means for facilitating welding detects an error in and initiates the transfer of information to send a troubleshooting request;

means for negotiating and selecting a frequency channel based on the frequency channel's availability, cost, usage rights, quality, and user preference; and means for temporarily using the selected frequency channel in communicating with a remote device located at a site remote to the welding system.

* * * * *